(12) United States Patent
Hoffjann et al.

(10) Patent No.: US 8,888,041 B2
(45) Date of Patent: Nov. 18, 2014

(54) TANK MODULE FOR A STRUCTURALLY INTEGRATED VACUUM SEWAGE SYSTEM FOR AIRCRAFT

(75) Inventors: Claus Hoffjann, Hamburg (DE); Wolfgang Zierold, Hamburg (DE)

(73) Assignee: Airbus Operations GmbH (DE)

( * ) Notice: Subject to any disclaimer, the term of this patent is extended or adjusted under 35 U.S.C. 154(b) by 1899 days.

(21) Appl. No.: 11/990,367

(22) PCT Filed: Aug. 3, 2006

(86) PCT No.: PCT/EP2006/007697
§ 371 (c)(1),
(2), (4) Date: Aug. 20, 2009

(87) PCT Pub. No.: WO2007/017184
PCT Pub. Date: Feb. 15, 2007

(65) Prior Publication Data
US 2010/0019088 A1    Jan. 28, 2010

Related U.S. Application Data

(60) Provisional application No. 60/706,576, filed on Aug. 9, 2005.

(30) Foreign Application Priority Data

Aug. 9, 2005    (DE) .......................... 10 2005 037 578

(51) Int. Cl.
*B64C 1/22*    (2006.01)
(52) U.S. Cl.
USPC ...................................... 244/118.2

(58) Field of Classification Search
USPC ............. 244/136, 118.2, 137.4, 137.1, 118.1, 244/118.5
See application file for complete search history.

(56) References Cited

U.S. PATENT DOCUMENTS

| | | | | |
|---|---|---|---|---|
| 2,387,527 A | * | 10/1945 | Nagamatsu | 244/118.2 |
| 2,448,862 A | * | 9/1948 | Conklin | 244/118.2 |
| 2,472,947 A | * | 6/1949 | Hlobil | 244/118.1 |
| 2,937,573 A | * | 5/1960 | Gantschnigg | 89/1.51 |
| 3,079,941 A | | 3/1963 | Cruise et al. | |
| 3,361,396 A | * | 1/1968 | Reno | 244/118.2 |
| 4,063,315 A | | 12/1977 | Carolan et al. | |
| 4,275,470 A | | 6/1981 | Badger et al. | |
| 4,306,693 A | * | 12/1981 | Cooper | 244/135 R |
| 4,426,050 A | * | 1/1984 | Long | 244/135 R |
| 5,002,592 A | | 3/1991 | Stroby et al. | |
| 5,931,642 A | | 8/1999 | Friedman et al. | |
| 6,123,495 A | * | 9/2000 | Callahan et al. | 414/340 |

(Continued)

FOREIGN PATENT DOCUMENTS

| | | |
|---|---|---|
| DE | 20 2004 017 942 U1 | 4/2005 |
| EP | 0 537 933 A1 | 4/1993 |
| GB | 546492 A | 7/1942 |
| GB | 555984 A | 9/1943 |

(Continued)

*Primary Examiner* — Tien Dinh
(74) *Attorney, Agent, or Firm* — Lerner, David, Littenberg, Krumholz & Mentlik, LLP

(57) ABSTRACT

A tank module for an aircraft is designed for being fitted into the aircraft fuselage from outside. The tank module comprises at least one receptacle and a shell section that forms an outer end of the tank module and is connected to the receptacle. The shell section can be fitted into a fuselage opening in such a way that the receptacle is positioned in the interior of the aircraft fuselage.

11 Claims, 1 Drawing Sheet

(56) References Cited

U.S. PATENT DOCUMENTS

| | | | |
|---|---|---|---|
| 6,554,227 B2 * | 4/2003 | Wolter | 244/140 |
| 7,980,513 B2 * | 7/2011 | Hoffjann et al. | 244/136 |
| 2009/0230243 A1 * | 9/2009 | Army et al. | 244/118.5 |

FOREIGN PATENT DOCUMENTS

| | | |
|---|---|---|
| JP | 11021972 A | 1/1999 |
| RU | 34479 U1 | 12/2003 |
| WO | WO-02/06594 A1 | 6/2001 |

* cited by examiner

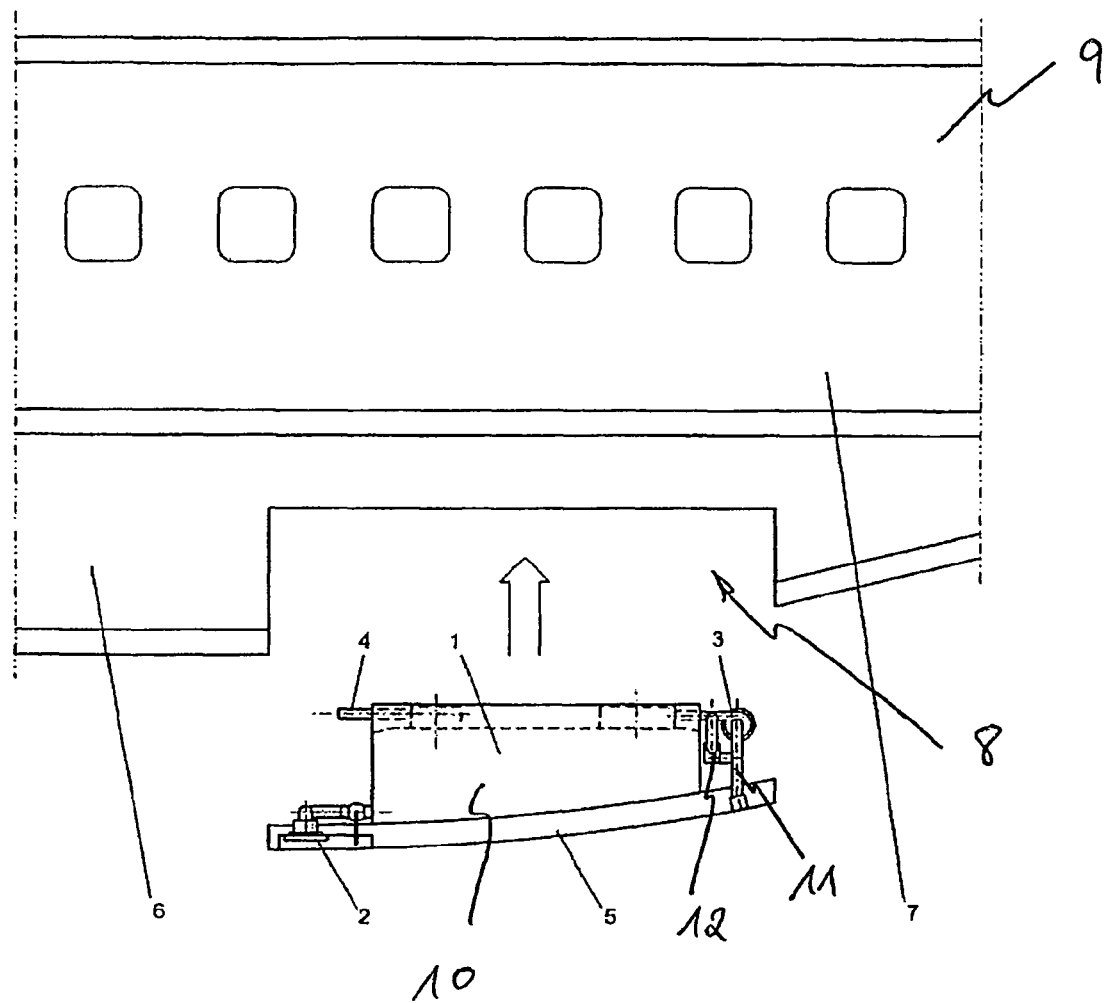

us 8,888,041 B2

TANK MODULE FOR A STRUCTURALLY INTEGRATED VACUUM SEWAGE SYSTEM FOR AIRCRAFT

REFERENCE TO RELATED APPLICATIONS

This application claims the benefit of the filing date of German Patent Application No. 10 2005 037 578.2 filed Aug. 9, 2005 and of U.S. Provisional Application No. 60/706,576 filed Aug. 9, 2005, the disclosure of which applications is hereby incorporated herein by reference.

FIELD OF THE INVENTION

The present invention generally pertains to the technical field of supplying and disposing liquid mediums in an aircraft. The invention specifically pertains to a tank module that can be fitted into an aircraft fuselage in the form of a separate component.

The invention furthermore pertains to an aircraft, in which at least one receptacle for containing a liquid media in the form of an aforementioned tank module is provided.

TECHNOLOGICAL BACKGROUND

In order to dispose of waste water in passenger aircraft, it is common practice to utilize vacuum waste water systems, in which fecal matter is transported through pipelines from a toilet bowl to a waste water collection tank with the aid of an air current. While the aircraft is in-flight, the air current results from the differential pressure between the outside air and the cabin air. After the aircraft lands on the ground, the thusly collected waste water can be disposed of through a drainage connection piece.

As a rule, waste water collection tanks consist of one or more separate receptacles that are rigidly mounted to the aircraft structure in the pressure zone of the cabin, particularly in the cargo area. Due to the size of the waste water collection tanks, they already need to be installed during the structural and equipment assembly of an aircraft that is therefore significantly prolonged. Due to the early installation of the waste water collection tanks during the structural and equipment assembly, they impair the additional assembly in the interior of the aircraft during this assembly step as well as the ensuing steps. Furthermore, the mounting of the waste water collection tank on the aircraft structure results in additional weight in the form of mounting elements for the waste water collection tanks and in the form of additional structural reinforcements for safely transferring the weight of the tanks into the structure of the aircraft such that the overall weight of the aircraft is undesirably increased.

SUMMARY OF THE INVENTION

Based on the above-described problems associated with known waste water collection tanks, the present invention aims to additionally develop a tank that is suitable, for example, for accommodating waste water in such a way that the above-described difficulties are diminished.

According to a first aspect of the present invention, a tank module is disclosed that is designed for being installed into a fuselage opening of an aircraft. In this case, the inventive tank module essentially comprises at least one receptacle as well as a shell section that forms an outer surface of the tank module and is connected to the receptacle. The shell section may consist, for example, of a section of a wall of the container. According to one particular embodiment, the bottom of the receptacle may be formed by the shell section. Naturally, it is also possible to position the shell section a certain distance from the receptacle, in which case the shell section is merely connected to the receptacle by means of a supporting or connecting structure.

In order to eliminate the requirement of already having to install the inventive tank module into the interior of an aircraft fuselage during the structural and equipment assembly, the shell section has a contour that corresponds to the contour of the fuselage opening of the aircraft fuselage such that the tank module can be fitted into the aircraft fuselage with its shell section at any time. In this case, the receptacle of the tank module is positioned in the interior of the aircraft fuselage and the fuselage opening is completely sealed by the shell section such that the exterior of the aircraft fuselage features no perceivable discontinuity.

The above-discussed embodiments indicate that it is possible to manufacture the tank module separately of the aircraft fuselage such that the structural and equipment assembly of the aircraft fuselage can be accelerated because the integration of the inventive tank module does not have to be carried out, for example, until the final assembly of the aircraft fuselage.

Whenever the term "shell section" is used in the context of the present invention, the term "shell" should always be understood in the sense attributed thereto in the field of statics. Consequently, the shell section consists of a monocoque component that is able to divert external loads into adjacent support constructions such as, for example, the fuselage opening in an aircraft due to its monocoque construction. On the other hand, the shell section is able to absorb loads originating from the aircraft fuselage due to its monocoque construction. The shell section therefore is able to compensate the comparatively significant discontinuity created in the aircraft fuselage by the fuselage opening such that the aircraft fuselage is only slightly weakened, if it all, as a result of the fuselage opening for accommodating the tank module.

As mentioned above, conventional waste water collection tanks, as a rule, need to be installed with the aid of auxiliary mounting elements and additional structural reinforcements in order to safely and reliably divert the loads originating from the waste water collection tanks into the aircraft structure. Under certain circumstances, the inventive integration of a tank module into a fuselage opening of an aircraft fuselage may require additional structural reinforcements in the region of the fuselage opening for accommodating the tank module, but these structural reinforcements add less weight than the mounting elements and additional structural reinforcements required for the installation of conventional waste water collection tanks such that this additional weight can be largely compensated with the invention.

In order to compensate the constructive weakening of the aircraft fuselage caused by the fuselage opening, the shell section has such dimensions that this weakening is compensated when the shell section is installed in the fuselage opening.

In order to prevent the fuselage opening in the aircraft fuselage from causing a pressure drop in the interior of the aircraft fuselage, the shell section tightly seals the interior of the aircraft fuselage relative to the exterior. Such a seal can be realized, for example, by very exactly adapting the outer contour of the shell section to the inner contour of the fuselage opening such that these two contour surfaces tightly adjoin one another in the assembled state and an equalization of pressure cannot take place. Since such a precisely fitted adaptation of the two contour surfaces can only be realized with great difficulty, it is also possible to provide the contour of the fuselage opening and/or the shell section with a peripheral sealing element, for example, a rubber seal that compensates possible dimensional inaccuracies of the two contour surfaces.

As mentioned above, the shell section of the tank module may form a lower end of the at least one receptacle, for example, in the form of a receptacle bottom, such that the tank module can be inserted, for example, into the underside of the aircraft fuselage, wherein the shell section forms an uninterrupted continuation of the skin of the aircraft fuselage in this case.

In order to improve the monocoque construction of the shell section of the tank module, the at least one receptacle and the shell section may be realized in one piece. For example, the tank module consisting of the receptacle and the shell section may be manufactured in the form of an injection-moulded part. Alternatively, an integral design of the receptacle and the shell section can also be achieved by manufacturing these two components in one piece from a fiber material, for example, a carbon-fiber reinforced plastic (abbreviated CFRP) or a glass-fiber reinforced plastic (abbreviate GFRP). Such composite fiber materials are extremely robust despite their low weight and therefore particularly suitable for use in the field of aeronautical and astronautical engineering.

Although the present invention is based on eliminating the above-described problems associated with conventional waste water collection tanks, the inventive design of a tank module can also be transferred to other receptacles such as, for example, fresh water receptacles or fuel tanks. The realization of a waste water receptacle, a fresh water receptacle or a fuel tank in the form of the inventive tank module may have the positive effect, for example, of shortening the maintenance times required between two flights. The refueling of an aircraft as well as the refilling of the fresh water supply and the disposal of the waste water between two flights are usually very time-consuming due to the frequently very low volume flow rates.

The time required for refilling and disposing of liquid mediums can be shortened by utilizing the inventive tank module in that empty waste water receptacles or freshly refilled fresh water receptacles or fuel tanks can already be prepared, for example, before the arrival of an aircraft such that the used waste water receptacles, fresh water receptacles or fuel tanks merely need to be exchanged. In contrast to the conventional refilling and disposal concept, this makes it possible to realize significant time savings during the maintenance intervals, i.e., the standstill times of an aircraft can be reduced and the in-flight times can be maximized such that the overall efficiency is improved.

In order to rapidly exchange the inventive tank module, the at least one receptacle of the tank module features a connection piece for connecting the at least one receptacle to a feed pipe system in the interior of the aircraft fuselage. Depending on the respective design of the receptacle (waste water receptacle, fresh water receptacle or fuel tank), this feed pipe system either consists of a (vacuum) pipe system that is connected to the toilets, of a fresh water pipe system that is connected to the galleys, lavatories and other fresh water consumers or of a fuel supply pipe system that is able to supply individual fuel consumers.

Since the differential pressure between the outside air and the inside cabin air is either non-existent or insufficient for generating the air current for disposing of fecal matter from the toilets at low flight altitudes or while the aircraft is a standstill in airports, the inventive tank module furthermore comprises a vacuum generator that is able to build up the required differential pressure. This vacuum generator makes it possible to generate a negative pressure in the receptacle and therefore in the feed pipe system such that fecal matter from the toilets and the pipeline system can be transported into the at least one receptacle of the tank module. Although the customary differential pressure at a normal flight altitude of approximately 8000-10000 m lies at approximately 570 mbar, it suffices to utilize a vacuum generator capable of generating a minimum differential pressure of 250-270 mbar in order to generate "artificial" differential pressures.

In order to obtain up-to-date information on the filling level in the least one receptacle of the tank module at all times, the tank module furthermore comprises a device that makes it possible to determine the instantaneous filling level. The maintenance and standstill times can be additionally reduced with such a filling level gauge because it allows a prognosis with respect to a possibly required exchange of a tank module.

Since the waste water receptacles of a tank module are not used to full capacity, particularly during short-range flights, the exchange of the tank module may not be necessary until the completion of two, three or even more short-range flights.

In order to largely automate the exchange and maintenance work to be performed on the inventive tank modules, a cleaning device may be provided in the tank module or in the at least one receptacle in order to carry out a cleaning process during standstill times, for example, in the form of a rinsing process.

According to the preceding disclosure, the interior of the least one receptacle of the inventive tank module directly borders on the skin of the aircraft fuselage in the form of a shell section of the tank module. However, since the outside temperatures are very low at high flight altitudes, the contents of the at least one receptacle have a tendency to freeze very easily at high flight altitudes. In order to solve this problem, the inventive tank module may furthermore comprise at least one device for heating the at least one receptacle. This device may consist, for example, of a heating jacket or a heating spiral that is integrated into the walls of the at least one receptacle.

Each tank furthermore features a drainage device in order to empty the at least one tank of the tank module. This drainage device may consist, for example, of a drainage connection piece that is assigned a corresponding shut-off valve. If the tank module comprises several receptacles, each receptacle may feature a separate drainage device with a drainage connection piece and an assigned shut-off valve, wherein all drainage units may be combined into a common drainage connection piece with assigned shut-off valve in the disposal direction such that all receptacles can be emptied via only one connection piece.

According to the preceding explanations, the inventive tank module may feature different electric consumers such that an electric energy supply is required. Electric energy is required, in particular, for the vacuum generator, the filling level gauge, the heating device and, if applicable, the cleaning device. In order to ensure the power supply for these electric consumers, the tank module furthermore features a connection for connecting the tank module to an electric power supply in the interior of the aircraft fuselage. If this connection is realized in the form of an electric plug-type connector, this may have the additional positive effect of further accelerating a rapid exchange of the tank module. The removal of the tank module from the aircraft fuselage may automatically separate the electric plug connection between the tank module and the electric power supply in the interior of the aircraft fuselage, wherein the connection with the electric power supply in the interior of the aircraft is automatically restored when the tank module is installed into the aircraft fuselage.

The preceding explanations clearly indicate that the inventive tank module makes it possible to significantly shorten the standstill and maintenance times of an aircraft such that the present invention has a direct influence on the aircraft as such. In this respect, another aspect of the present invention pertains to an aircraft that features at least one receptacle that is used as a waste water receptacle, fresh water receptacle or fuel tank, wherein said the tank module is realized in accordance with the above-described characteristics.

SHORT DESCRIPTION OF THE DRAWINGS

The invention is described in an exemplary fashion below with reference to the enclosed drawing. In the drawing, FIG. 1 shows a projection of an inventive tank module during the installation into a fuselage opening of an aircraft fuselage.

Although the drawing in FIG. 1 is not necessarily true-to-scale, it reflects quantitative size relations.

DETAILED DESCRIPTION OF AN EXEMPLARY EMBODIMENT

FIG. 1 shows an inventive tank module 1 shortly before its installation into a fuselage opening 8 of an aircraft fuselage 9. The tank module 1 essentially comprises a shell section 5 that is realized in the form of a fuselage shell in this case, as well as a receptacle 10 that is integrally connected to the shell section 5 on the inner side thereof. Although only one receptacle 10 is visible due to perspective representation, it would naturally also be possible to arrange more than only one receptacle on the shell section 5.

Instead of integrally connecting the shell section 5 to the at least one receptacle 10 as described above, it would also be possible to space apart the shell section 5 from the receptacle 10 by a certain distance, for example, with the aid of spacer elements. In the tank module 1 shown in FIG. 1, however, the shell section 5 is arranged such that it forms the bottom of the receptacle 10.

The receptacle 10 as well as the shell section 5 may be manufactured, for example, from composite fiber materials such as, for example, GFRP or CFRP. An integral design of the tank module consisting of the receptacle 10 and the shell section 5 provides the positive effect of the sidewalls of the receptacle 10 contributing to the reinforcement of the shell section 5 in this case such that the monocoque construction of the shell section 5 is additionally improved.

FIG. 1 also shows that the outer border of the shell section is exactly adapted to the contour of the fuselage opening 8 such that the tank module can be inserted into the fuselage opening 8 in a precisely fitted fashion with its shell section 5 and the receptacle 10 is ultimately positioned in the cargo area 6 in the interior of the aircraft fuselage 9. In the installed state of the tank module 1, the shell section 5 seals the cargo area 6 relative to the outside atmosphere, wherein the shell section 5 forms the lower end of the receptacle 10 and simultaneously seals the fuselage opening 8.

On its upper side, the receptacle 10 is provided with a pipe connection piece 4 for connecting the receptacle 10 to a feed pipe system in the interior of the aircraft fuselage. This connection piece 4 may consist, for example, of a vacuum line connection such that fecal matter can be removed by suction and transported into the receptacle 10 via the feed pipe system in the interior of the aircraft with the aid of a vacuum generated in the receptacle 10.

In order to generate such a vacuum feed current, a vacuum generator 3 is arranged on the tank module 1 and designed for evacuating the receptacle 10. The vacuum generator 3 transports the air evacuated from the receptacle 10 outward via the outside air connection 11.

In order to utilize the differential pressure between the outside air and the cabin air that exists at high flight altitudes for the evacuation of the receptacle 10, the tank module 1 is furthermore provided with a bypass line 12 that makes it possible to convey a parallel air current past the vacuum generator 3. Due to this measure, the differential pressure between the outside air and the inside cabin air at high flight altitudes makes it possible to evacuate the receptacle 10 by means of this differential pressure only such that the vacuum generator 3 only needs to be switched on while the aircraft is at a standstill on the ground or flying at low flight altitudes.

In order to drain the fecal matter situated in the receptacle 10, the tank module 1 furthermore features a drainage device 2 for removing this fecal matter outward by means of suction.

Although not explicitly illustrated, the tank module may furthermore comprise a device for determining the instantaneous filling level in the receptacle 10. It would also be possible to provide a device for cleaning the interior of the receptacle, for example, in the form of a rinsing process.

According to FIG. 1, the receptacle 10 directly borders on the skin 5 in the form of a shell section such that the mostly liquid contents of the receptacle 10 have a tendency to freeze, particularly at the low temperatures that prevail at high flight altitudes. In order to eliminate this freezing hazard, the inventive tank module 1 may furthermore comprise a device for heating the at least one receptacle 10 that can be integrated, for example, into the walls of the receptacle in the form of a heating jacket or a heating spiral.

REFERENCE LIST

1 Tank module
2 Drainage device
3 Vacuum generator
4 Feed pipe connector
5 Shell section
6 Cargo area
7 Passenger cabin
8 Fuselage opening
9 Aircraft fuselage
10 Receptacle
11 Outside air connection
12 Bypass line

What is claimed is:
1. A tank module for installation into a fuselage opening of an aircraft fuselage, comprising:
at least one waste water receptacle,
a shell section forming an outer end of the tank module and connected to the at least one waste water receptacle,
at least one vacuum generator, and
a bypass line,
wherein the shell section has a contour corresponding to the fuselage opening, the tank module being configured to be fitted with the shell section thereof into the fuselage opening such that the at least one waste water receptacle is positioned in the interior of the aircraft fuselage,
wherein the shell section is configured to seal the interior of the aircraft fuselage relative to the exterior such that an equalization of pressure between the interior of the aircraft fueslage and an outside atmosphere cannot take place, wherein the at least one waste water receptacle comprises a connector for connecting the at least one waste water receptacle to a feed pipe system in the interior of the aircraft fuselage, wherein the at least one vacuum generator is configured for generating a suction air current from the feed pipe system into the at least one waste water receptacle via the at least one waste water receptacle, and wherein the bypass line is configured to convey a parallel air current past the at least one vacuum generator by using a differential pressure between an outside air and the cabin air.

2. The tank module of claim 1, wherein the shell section forms a lower end of the at least one receptacle to fit into the underside of the fuselage opening.

3. The tank module of claim 1, wherein the at least one waste water receptacle and the shell section are formed in one piece.

4. The tank module of claim 1, wherein the at least one waste water receptacle and the shell section are manufactured from a composite fiber material.

5. The tank module of claim 1, wherein the shell section has such dimensions that a constructive weakening of the aircraft fuselage caused by the fuselage opening is compensated when the shell section is installed into the fuselage opening of the aircraft fuselage.

6. The tank module of claim 1, further comprising at least one device for determining the instantaneous filling level of the at least one waste water receptacle.

7. The tank module of claim 1, further comprising at least one device for cleaning the at least one waste water receptacle.

8. The tank module of claim 1, further comprising at least one device for heating the at least one waste water receptacle and integrated into the walls of the at least one waste water receptacle.

9. The tank module of claim 1, further comprising at least one drainage device for emptying the at least one waste water receptacle.

10. The tank module of claim 1, further comprising at least one connection for connecting the tank module to an electric power supply in the interior of the aircraft fuselage.

11. An aircraft comprising a waste water receptacles, wherein the waste water receptacle comprises a tank module comprising:

the at least one waste water receptacle, a shell section forming an outer end of the tank module and connected to the at least one waste water receptacle, at least one vacuum generator, and and a bypass line, wherein the shell section has a contour corresponding to the fuselage opening, the tank module configured to be fitted with the shell section thereof into the fuselage opening such that the at least one waste water receptacle is positioned in the interior of the aircraft fuselage, wherein the shell section is configured to seal the interior of the aircraft fuselage relative to the exterior such that an equalization of pressure between the interior of the aircraft fuselage and an outside atmosphere cannot take place, wherein the at least one waste water receptacle comprises a connector for connecting the at least one waste water receptacle to a feed pipe system in the interior of the aircraft fuselage, wherein the at least one vacuum generator is configured for generating a suction air current from the feed pipe system into the at least one waste water receptacle via the at least one waste water receptacle, and wherein the bypass line is configured to convey a parallel air current past the at least one vacuum generator by using a differential pressure between an outside air and the cabin air.

* * * * *